(12) United States Patent
Ikeda et al.

(10) Patent No.: US 10,468,648 B2
(45) Date of Patent: Nov. 5, 2019

(54) BATTERY PACK FOR ELECTRIC POWER TOOL

(71) Applicant: Panasonic Intellectual Property Management Co., Ltd., Osaka (JP)

(72) Inventors: Masaki Ikeda, Mie (JP); Akira Kawai, Mie (JP); Naoki Tsuruta, Mie (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/989,643

(22) Filed: Jan. 6, 2016

(65) Prior Publication Data

US 2016/0226044 A1 Aug. 4, 2016

(30) Foreign Application Priority Data

Jan. 30, 2015 (JP) .................. 2015-017238

(51) Int. Cl.
*H01M 2/12* (2006.01)
*B25B 21/00* (2006.01)
(Continued)

(52) U.S. Cl.
CPC ........... *H01M 2/1241* (2013.01); *B25B 21/00* (2013.01); *H01M 2/1022* (2013.01); *H01M 2/1055* (2013.01); *H01M 2/30* (2013.01); *H01M 10/425* (2013.01); *H01M 10/4207* (2013.01); *H01M 2200/20* (2013.01); *H01M 2220/30* (2013.01)

(58) Field of Classification Search
CPC ..... H01M 2/12; H01M 2/1235; H01M 2/1241
See application file for complete search history.

(56) References Cited

U.S. PATENT DOCUMENTS

| 4,835,452 A | 5/1989 | Kuriyama |
| 2005/0287422 A1* | 12/2005 | Kim .................... H01M 2/1241 429/53 |

(Continued)

FOREIGN PATENT DOCUMENTS

| JP | S63-78452 A | 4/1988 |
| JP | H06-062457 U | 9/1994 |

(Continued)

OTHER PUBLICATIONS

Extended European Search Report issued in corresponding European Patent Application No. 16151797.4, dated Apr. 20, 2016.

(Continued)

*Primary Examiner* — Jonathan G Leong
(74) *Attorney, Agent, or Firm* — McDermott Will & Emery LLP

(57) ABSTRACT

A battery pack for an electric power tool is adapted for attachment in a removable manner to a tool body of the electric power tool. The battery pack includes an outer shell and a rechargeable battery unit accommodated in the outer shell. The rechargeable battery unit includes at least one rechargeable battery cell, a battery case that is sealed accommodating the at least one rechargeable battery cell, and a relief valve arranged on the battery case. The relief valve is configured to open when the at least one rechargeable battery cell generates gas and builds up pressure in the battery case to a predetermined value or greater.

14 Claims, 2 Drawing Sheets

(51) Int. Cl.
*H01M 2/10* (2006.01)
*H01M 2/30* (2006.01)
*H01M 10/42* (2006.01)

(56) References Cited

U.S. PATENT DOCUMENTS

| | | | |
|---|---|---|---|
| 2010/0112435 A1 | 5/2010 | Hanawa et al. | |
| 2011/0005793 A1 | 1/2011 | Hanawa et al. | |
| 2011/0097619 A1* | 4/2011 | Park | H01M 2/105 |
| | | | 429/159 |
| 2011/0111270 A1 | 5/2011 | Osswald | |
| 2012/0037385 A1 | 2/2012 | Suzuki et al. | |
| 2013/0164567 A1* | 6/2013 | Olsson | H01M 10/488 |
| | | | 429/7 |
| 2014/0154532 A1* | 6/2014 | Chellew | H01M 2/105 |
| | | | 429/7 |

FOREIGN PATENT DOCUMENTS

| | | |
|---|---|---|
| JP | 2000-149887 A | 5/2000 |
| JP | 2008-066141 A | 3/2008 |
| JP | 2011-525688 A | 9/2011 |
| JP | 2013-191289 A | 9/2013 |
| JP | 2014-032862 A | 2/2014 |
| WO | WO-2013019203 A1 * | 2/2013 ............ H01M 2/105 |

OTHER PUBLICATIONS

Office Action issued in corresponding Japanese Application No. 2015-017238 dated May 22, 2018.
Japanese Office Action dated Mar. 19, 2019, issued in Japanese Patent Application No. 2015-017238; with English translation.

* cited by examiner

BATTERY PACK FOR ELECTRIC POWER TOOL

CROSS-REFERENCE TO RELATED APPLICATIONS

This application is based upon and claims the benefit of priority from prior Japanese Patent Application No. 2015-017238, filed on Jan. 30, 2015, the entire contents of which are incorporated herein by reference.

FIELD

The present invention relates to battery packs for electric power tools.

BACKGROUND

Japanese Laid-Open Patent Publication No. 2013-191289 describes a hand-held electric power tool. The electric power tool includes a tool body, which incorporates a motor and a control circuit, and a battery pack, which is attached to the tool body to supply power to the tool body.

SUMMARY

Electric power tools may be used under various weather conditions. The inventors of the present invention have conducted studies to develop a battery pack having improved water and dust resistance. Through the studies, the inventors have learned that there is a need to cope with gas that is generated from rechargeable battery cells of the battery pack.

It is an object of the present disclosure to provide a battery pack including a water and dustproof structure that can cope with gas generated from a rechargeable battery cell.

One aspect of the present invention is a battery pack for an electric power tool. The battery pack is adapted for attachment in a removable manner to a tool body of the electric power tool. The battery pack includes an outer shell and a rechargeable battery unit accommodated in the outer shell. The rechargeable battery unit includes at least one rechargeable battery cell, a battery case that is sealed accommodating the at least one rechargeable battery cell, and a relief valve arranged on the battery case. The relief valve is configured to open when the at least one rechargeable battery cell generates gas and builds up pressure in the battery case to a predetermined value or greater.

The above aspect of the present invention improves the water and dust resistance and prevents or reduces damages to the battery case inflicted by gas generated from the rechargeable battery cell. Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DESCRIPTION OF EMBODIMENTS

One embodiment of a battery pack for an electric power tool will now be described.

Figure 1:
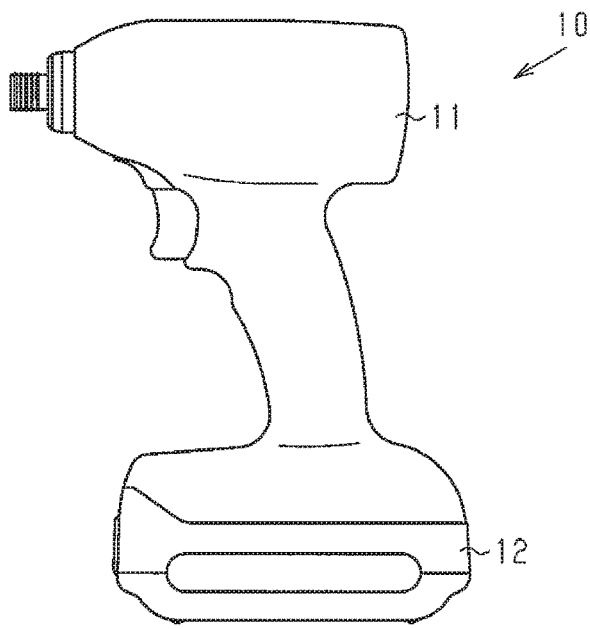
FIG. 1 is a schematic diagram illustrating one embodiment of an electric power tool.

FIG. 1 illustrates an electric power tool 10, which is hand-carried and rechargeable. The electric power tool 10 includes a tool body 11 and a battery pack 12, which is adapted for attachment in a removable manner to the tool body 11. The battery pack 12 supplies power to a motor and a control circuit (none illustrated), which are located in the tool body 11. In a non-limiting example, the electric power tool 10 may be a rotary impact tool.

Figure 2:
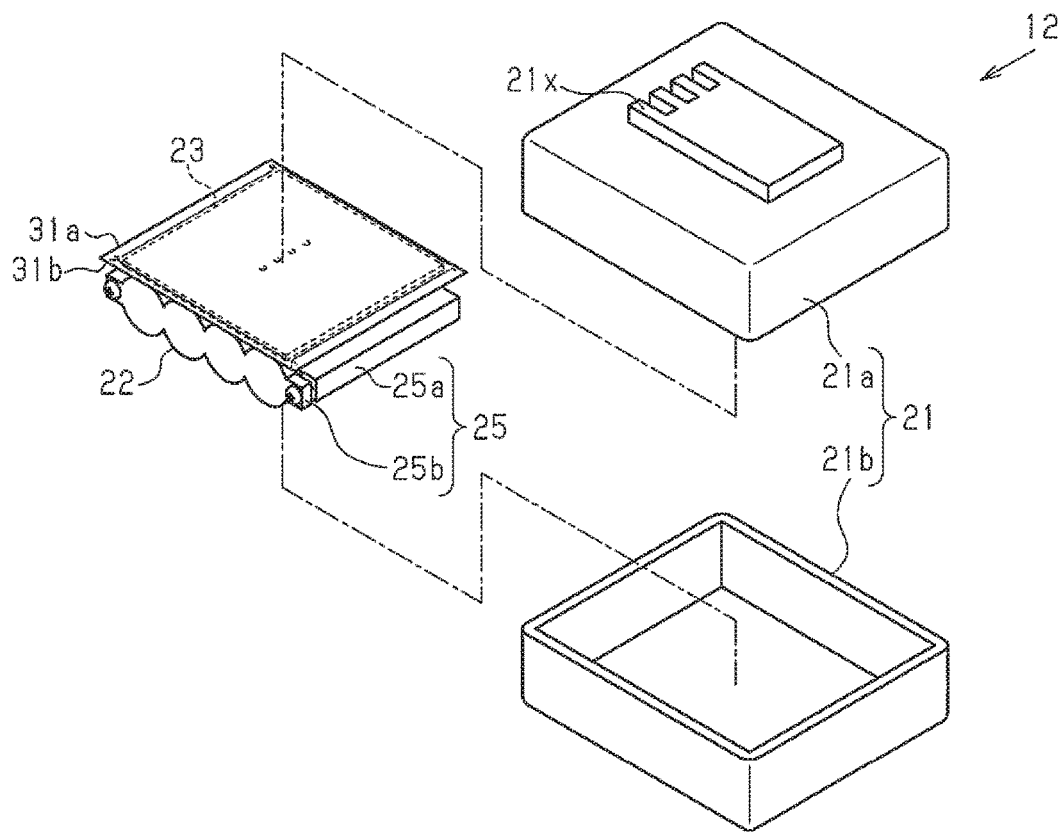
FIG. 2 is an exploded perspective view illustrating the structure of a battery pack.

As illustrated in FIG. 2, the battery pack 12 includes an outer shell 21, a rechargeable battery unit 22, and a circuit board 23. The rechargeable battery unit 22 and the circuit board 23 are accommodated in the outer shell 21. An upper shell 21a and a lower shell 21b are integrated with each other to form the outer shell 21. A terminal coupler 21x is arranged on an upper surface of the upper shell 21a to electrically connect the battery pack 12 to the tool body 11. The terminal coupler 21x is electrically connected to the rechargeable battery unit 22 and the circuit board 23, which are located in the outer shell 21. The outer shell 21 is not airproof.

Figure 3:
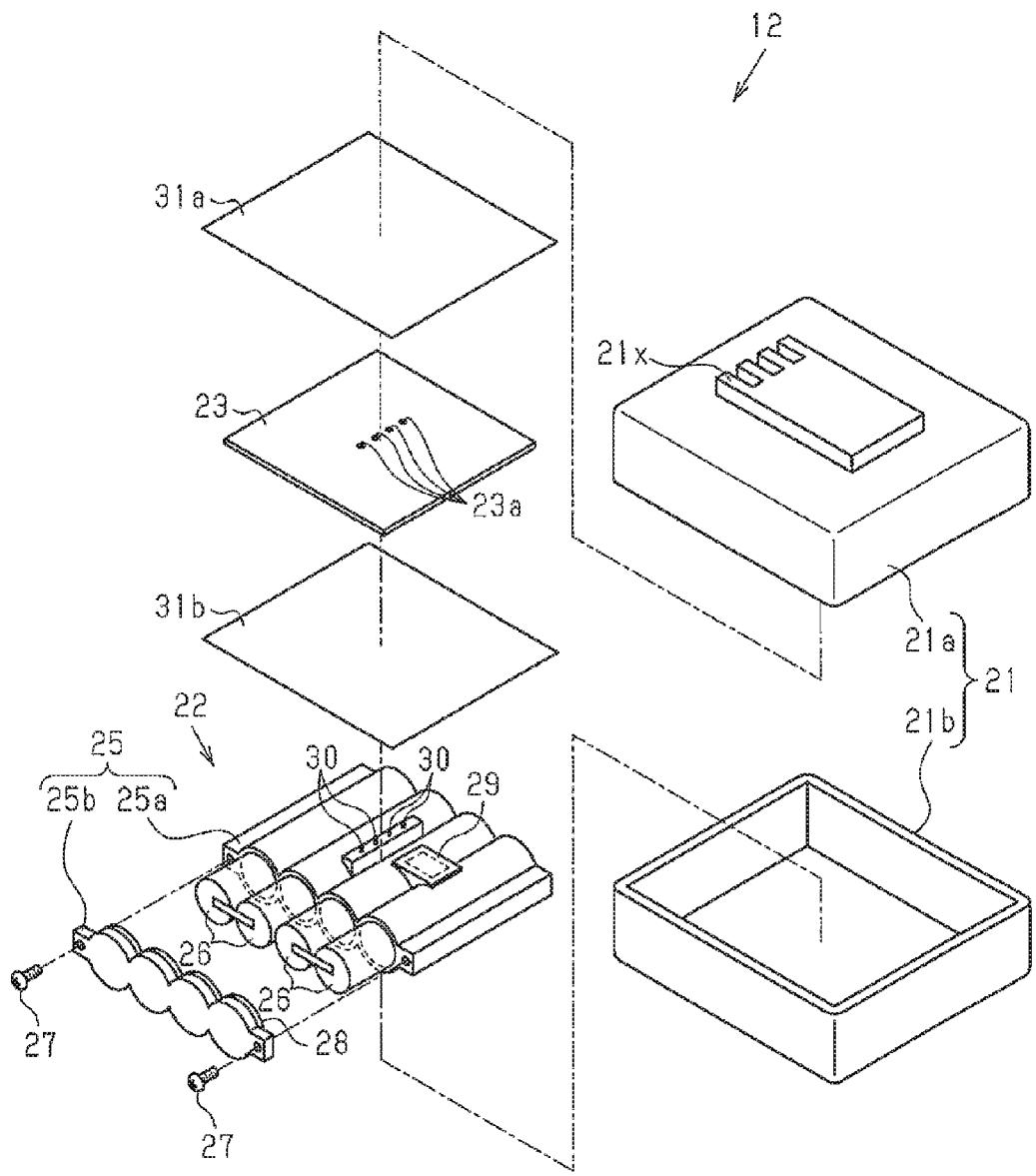
FIG. 3 is an exploded perspective view illustrating the structure of the battery pack.

As illustrated in FIG. 3, the rechargeable battery unit 22 includes a battery case 25 and rechargeable battery cells 26. The battery case 25 includes a case body 25a and a lid 25b. The case body 25a includes at least one inlet to allow for the insertion of the rechargeable battery cells 26. The case body 25a is shaped to accommodate the rechargeable battery cells 26. For example, the case body 25a may include linear cylindrical bores in a parallel arrangement respectively corresponding to the rechargeable battery cells 26. The lid 25b closes the inlet of the case body 25a. The lid 25b is securely attached to the case body 25a by, for example, screws 27. The lid 25b may include a seal 28 adhered around the entire inlet of the case body 25a. The case body 25a and the lid 25b seal the battery case 25 in an airproof manner. The case body 25a and the lid 25b function as a water and dustproof structure. The outer shell 21 and the battery case 25 cooperate to form a double wall structure. The outer shell 21 has a lower level of water and dustproof resistance than the battery case 25.

A relief valve 29 is arranged on the outer surface, preferably, the upper surface, of the case body 25a of the battery case 25. The relief valve 29 releases gas from the battery case 25 when the rechargeable battery cells 26 generate gas. The relief pressure of the relief valve 29 may be determined in advance through experiments.

The inventors of the present invention have formed a battery case of a comparative example to check the effectiveness of the relief valve 29. The battery case of the comparative example is identical to the battery case 25 of the illustrated embodiment except that the relief valve 29 is omitted. In the comparative example, when the rechargeable battery cells 26 generate gas, pressure builds up in the battery case. This may result in damage, such as cracking, of the battery case.

In the present embodiment, priority is given to the release of gas from the battery case 25 through the relief valve 29. This obviates damage of the battery case 25, excluding the relief valve 29. Preferably, the relief pressure of the relief valve 29 is determined so that that the relief valve 29 opens before a pressure buildup in the battery case 25 damages the battery case 25.

The relief valve 29 releases gas into the void between the battery case 25 and the outer shell 21. The gas is then released from the non-airproof outer shell 21 and out of the battery pack 12.

The relief valve 29 may include a valve hole, which is located in the outer surface, preferably, the upper surface, of the battery case 25 (case body 25a), and a film, which functions as a valve member. The film is thermally fused to the battery case 25 around the valve hole. The film is configured to rip when pressure builds up in the battery case 25 and reaches the relief pressure. The film may be referred to as a rippable film. To facilitate manufacturing of the relief valve 29, it is preferred that the film be formed of a material that can be thermally fused to the battery case 25. Instead of being thermally fused, the film may be attached by an adhesive to the battery case 25. When necessary, the film may have a locally weakened structure to finely adjust the ripping initiation location and/or the ripping pressure (relief pressure) of the film.

Connection terminals 30 project from the outer surface, preferably, the upper surface, of the case body 25a of the battery case 25. The connection terminals 30 are locally concentrated and form a connection terminal array. In a non-restrictive example, the connection terminal array is linear. The connection terminals 30 are electrically connected to the rechargeable battery cells 26 in the case body 25a. Preferably, the interval between two adjacent connection terminals 30 is set to a dimension that allows for the passage of water when water reaches the battery case 25. Preferably, a waterproof treatment, such as the application of a sealing resin, is performed on each connection terminal 30, for example, around the basal end of the connection terminal 30. Each connection terminal 30 may be a terminal formed by a rust-resistant metal or alloy, such as an aluminum terminal. The distal portion of each connection terminal 30 is electrically connected to the circuit board 23.

The circuit board 23 may include a detection circuit, which detects the battery state such as the voltage of the battery pack 12 (rechargeable battery cells 26), and a display circuit, which displays the detected state. The circuit board 23 includes sockets 23a respectively corresponding to the connection terminals 30 of the rechargeable battery unit 22. Each connection terminal 30 is electrically connected to the corresponding socket 23a. Each socket 23a may be a through hole. The connection terminals 30 are inserted into and soldered to the sockets 23a. The two opposite surfaces of the circuit board 23 are respectively covered by waterproof sheets 31a and 31b. The waterproof sheets 31a and 31b enclose the entire circuit board 23 to protect the circuit board 23 from water and dust. This also protects the portions where the connection terminals 30 and the sockets are connected from water and dust. The waterproof sheets 31a and 31b function as a water and dustproof structure for the circuit board 23.

The circuit board 23 and the rechargeable battery unit 22 are accommodated in the outer shell 21. Further, the portions where the circuit board 23 and the rechargeable battery unit 22 are connected are also protected by the water and dustproof structure. Thus, even if water or moisture enters the outer shell 21, failures such as short-circuiting of the circuit board 23 or the rechargeable battery unit 22 are prevented or reduced in the outer shell 21. The rechargeable battery unit 22 includes a sealed structure, which provides water and dust resistance, and the relief valve 29, which releases gas from the rechargeable battery unit 22. When the rechargeable battery cell 26 generates gas and the pressure built up in the battery case 25 becomes excessively high, the relief valve 29 functions to prevent damage to the battery case 25.

The advantages of the present embodiment will now be described.

(1) The battery pack 12 includes the outer shell 21 and the rechargeable battery unit 22 accommodated in the outer shell 21. The rechargeable battery unit 22 includes at least one rechargeable battery cell 26, the battery case 25 that is sealed accommodating the at least one rechargeable battery cell 26, and the relief valve 29 arranged on the battery case 25. The relief valve 29 is configured to open when the at least one rechargeable battery cell 26 generates gas and builds up pressure in the battery case 25 to a predetermined value (relief pressure) or greater.

The battery pack 12 improves the water and dust resistance. Further, when the rechargeable battery cell 26 generates gas, the gas is released from the battery case 25 while preventing or reducing damage to the battery case 25, excluding the relief valve 29. For example, the relief valve 29 may be repaired or replaced so that the battery case 25 can be reused.

(2) The battery pack 12 includes the circuit board 23 accommodated in the outer shell 21. The rechargeable battery unit 22 includes the connection terminals 30 electrically connected to the circuit board 23, and the connection terminals 30 are locally concentrated and form a connection terminal array. The battery pack 12 easily realizes a water and dustproof structure for the portions electrically connecting the rechargeable battery unit 22 and the circuit board 23.

(3) The rechargeable battery cells 26 are encapsulated in the battery case 25 in an airproof manner. The battery case 25 is encapsulated in the outer shell 21 in a non-airproof manner. The battery pack 12 releases the gas generated in the battery case 25 out of the battery case 25 through the relief valve 29 of the battery case 25 and the non-airproof outer shell 21.

(4) In a preferred example, the relief valve includes a rippable film functioning as a valve member. The film is fixed to the battery case around a valve hole. The relief valve may be formed by performing a relatively simple thermal fusing process. Further, ripping of the film can be visually checked. For example, a person inspecting the battery pack 12 can visually check for generation events or generation history of gas from the rechargeable battery cell 26. Further, for example, the ripped film may be replaced so that the battery case 25 can be reused.

It should be apparent to those skilled in the art that the present invention may be embodied in many other specific forms without departing from the spirit or scope of the invention. Particularly, it should be understood that the present invention may be embodied in the following forms.

The battery case 25 may be formed from a material having a high heat-dissipation effect. Further, the battery case 25 may include a heat-dissipation structure.

The relief valve 29 of the battery case 25 may be changed in structure. Further, the water and dustproof structure of the rechargeable battery unit 22 (battery case 25) and the water and dustproof structure of the circuit board 23 may be changed.

The circuit board 23 may be omitted from the battery pack 12.

The invention is not limited to the foregoing embodiments and various changes and modifications of its components may be made without departing from the scope of the present invention. Also, the components disclosed in the embodiments may be assembled in any combination for embodying the present invention. For example, some of the components may be omitted from all components disclosed in the embodiments. Further, components in different embodiments may be appropriately combined. The scope of the present invention and equivalence of the present invention are to be understood with reference to the appended claims.

The invention claimed is:

1. A battery pack for an electric power tool, wherein the battery pack is adapted for attachment in a removable manner to a lowermost portion of a tool body of the electric power tool, the battery pack comprising:
   an outer shell including an upper surface, wherein the upper surface of the outer shell includes a terminal coupler configured to be electrically connected to the tool body and the upper surface of the outer shell is configured to be attached to the lowermost portion of the tool; and
   a rechargeable battery unit accommodated in the outer shell, and
   a circuit board accommodated in the outer shell,
   wherein the rechargeable battery unit includes:
   a plurality of cylindrical rechargeable battery cells, which extend in parallel to one another, each of the plurality of cylindrical rechargeable battery cells having a longitudinal axis,
   a battery case that is sealed accommodating the plurality of cylindrical rechargeable battery cells, and
   a relief valve arranged on an upper surface of the battery case, wherein the relief valve is configured to open when at least one of the plurality of cylindrical rechargeable battery cells generates gas and builds up pressure in the battery case to a predetermined value or greater, the upper surface of the battery case being closer to the upper surface of the outer shell than a lower surface of the battery case,
   wherein the relief valve includes a valve hole located in the upper surface of the battery case and a rippable film fixed to the upper surface of the battery case around the valve hole, the rippable film functioning as a valve member, and wherein the rippable film is configured and arranged such that ripping of the rippable film is visually checked from outside the battery case to determine generation events or generation history of gas from the rechargeable battery cell,
   the battery case further includes connection terminals upwardly projecting from the battery case and arranged in a row extending in parallel to the longitudinal axes of the cylindrical rechargeable battery cells,
   the circuit board is arranged inside the outer shell and covers the upper surface of the battery case,
   the upper surface of the battery case includes at least one linear groove or valley extending in parallel to the longitudinal axes of the cylindrical rechargeable battery cells,
   the relief valve and the connection terminals are at least partly arranged at the at least one linear groove or valley.

2. The battery pack according to claim 1, wherein the connection terminals are electrically connected to the circuit board, and the connection terminals are locally concentrated and form a connection terminal array.

3. The battery pack according to claim 1, wherein the outer shell and the battery case form a double wall structure.

4. The battery pack according to claim 1, wherein the outer shell and the battery case each have water and dustproof resistance, and the outer shell has a lower level of water and dustproof resistance than the battery case.

5. The battery pack according to claim 1, wherein the plurality of cylindrical rechargeable battery cells are encapsulated in the battery case in an airproof manner, and the battery case is encapsulated in the outer shell in a non-airproof manner.

6. The battery pack according to claim 1, wherein the rippable film of the relief valve is thermally fused to the upper surface of the battery case around the valve hole.

7. The battery pack according to claim 1, wherein the battery case is arranged in a non-airproof inner space of the outer shell in such a manner that a non-airproof empty space, which is not occupied by the battery case, is formed in the outer shell, and wherein the relief valve is a gas relief valve configured to release gas generated by the at least one of the plurality of cylindrical rechargeable battery cells in the battery case to the non-airproof empty space of the outer shell.

8. The battery pack according to claim 1, wherein the circuit board covers the relief valve in a thickness direction of the battery case, the thickness direction being the direction defined by an axis extending through and perpendicular to both the upper surface of the outer shell and a lower surface of the outer shell.

9. The battery pack according to claim 1, further comprising a first water proof sheet and a second water proof sheet which enclose the circuit board.

10. An electric power tool comprising:
    a tool body; and
    a battery pack configured to be removably attached to a lowermost portion of the tool body,
    wherein the battery pack includes:
    an outer shell including an upper surface, wherein the upper surface of the outer shell includes a terminal coupler configured to be electrically connected to the tool body and the upper surface of the outer shell is configured to be attached to the lowermost portion of the tool, and
    a rechargeable battery unit accommodated in the outer shell, and
    a circuit board accommodated in the outer shell,
    wherein the rechargeable battery unit includes:
    a plurality of cylindrical rechargeable battery cells, which extend in parallel to one another, each of the plurality of cylindrical rechargeable battery cells having a longitudinal axis,
    a battery case that is sealed accommodating the plurality of cylindrical rechargeable battery cells, and
    a relief valve arranged on an upper surface of the battery case, wherein the relief valve is configured to open when the at least one rechargeable battery cell generates gas and builds up pressure in the battery case to a predetermined value or greater, the upper surface of the battery case being closer to the upper surface of the outer shell than a lower surface of the battery case, and
    wherein the relief valve includes a valve hole located in the upper surface of the battery case and a rippable film fixed to the upper surface of the battery case around the valve hole, the rippable film functioning as a valve member, and wherein the rippable film is configured and arranged such that ripping of the rippable film is visually checked from outside the battery case to determine generation events or generation history of gas from the rechargeable battery cell, the battery case further includes connection terminals upwardly projecting from the battery case and arranged in a row extending in parallel to the longitudinal axes of the cylindrical rechargeable battery cells, the circuit board is arranged inside the outer shell and covers the upper surface of the battery case, the upper surface of the battery case includes at least one linear groove or valley extending in parallel to the longitudinal axes of the cylindrical rechargeable battery cells, the relief valve and the connection terminals are at least partly arranged at the at least one linear groove or valley.

11. The electric power tool according to claim 10, wherein the relief valve of the battery case is arranged underneath the terminal coupler of the outer shell.

12. The electric power tool according to claim 10, wherein the tool body includes an upright hand grip portion extending upwardly from the lowermost portion of the tool body, and wherein the lowermost portion of the tool body covers the terminal coupler of the outer shell when the battery pack is attached to the lowermost portion of the tool body.

13. The electric power tool according to claim 10, wherein the circuit board covers the relief valve in a thickness direction of the battery case, the thickness direction being the direction defined by an axis extending through and perpendicular to both the upper surface of the outer shell and a lower surface of the outer shell.

14. The electric power tool according to claim 10, wherein the battery pack further comprises a first water proof sheet and a second water proof sheet which enclose the circuit board.

* * * * *